United States Patent
Beattie, Jr. et al.

(10) Patent No.: US 11,445,230 B2
(45) Date of Patent: Sep. 13, 2022

(54) ANALYSIS OF COPY PROTECTED CONTENT AND USER STREAMS

(71) Applicant: AT&T Intellectual Property I, L.P., Atlanta, GA (US)

(72) Inventors: James Gordon Beattie, Jr., Bergenfield, NJ (US); Haywood S. Peitzer, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/103,863

(22) Filed: Nov. 24, 2020

(65) Prior Publication Data

US 2022/0167035 A1 May 26, 2022

(51) Int. Cl.
*H04N 21/254* (2011.01)
*H04N 21/4627* (2011.01)
*H04N 21/2343* (2011.01)
*H04N 21/2347* (2011.01)
*H04N 21/44* (2011.01)
*H04N 21/441* (2011.01)
*H04N 21/2662* (2011.01)

(52) U.S. Cl.
CPC ..... *H04N 21/2541* (2013.01); *H04N 21/2343* (2013.01); *H04N 21/2347* (2013.01); *H04N 21/2662* (2013.01); *H04N 21/441* (2013.01); *H04N 21/44008* (2013.01); *H04N 21/4627* (2013.01)

(58) Field of Classification Search
CPC ........... H04N 21/2541; H04N 21/2343; H04N 21/2347; H04N 21/2662; H04N 21/44008; H04N 21/441; H04N 21/4627
See application file for complete search history.

(56) References Cited

U.S. PATENT DOCUMENTS

| | | | |
|---|---|---|---|
| 10,972,465 B1* | 4/2021 | Bendersky | H04L 9/3213 |
| 2010/0054333 A1* | 3/2010 | Bing | H04N 19/115 |
| | | | 375/240.12 |
| 2011/0247042 A1* | 10/2011 | Mallinson | H04N 21/44008 |
| | | | 725/86 |
| 2012/0251083 A1* | 10/2012 | Svendsen | H04N 21/233 |
| | | | 386/285 |
| 2013/0179921 A1* | 7/2013 | Ma | H04N 21/4821 |
| | | | 725/39 |
| 2015/0135209 A1* | 5/2015 | LaBosco | H04N 21/43635 |
| | | | 725/31 |
| 2020/0136858 A1* | 4/2020 | Rotti | G06F 21/606 |
| 2021/0176533 A1 | 6/2021 | Beattie et al. | |
| 2021/0366074 A1 | 11/2021 | Beattie et al. | |

* cited by examiner

*Primary Examiner* — Sumaiya A Chowdhury

(57) ABSTRACT

In one example, a method performed by a processing system including at least one processor includes obtaining a first stream of audio and video data, wherein the first stream of audio and video data comprises a lower-resolution version of a second stream of audio and video data that is transmitted to a first user device over a content distribution network and encrypted using a high-bandwidth digital content protection protocol, performing an analysis technique on the first stream of audio and video data in order to extract audio and video artifacts which from which content of the first stream of audio and video data is inferred, deriving a signature marker from the audio and video artifacts, and sending the signature marker to the first user device.

20 Claims, 3 Drawing Sheets

ANALYSIS OF COPY PROTECTED CONTENT AND USER STREAMS

The present disclosure relates generally to digital media distribution, and relates more particularly to devices, non-transitory computer-readable media, and methods for improving the analysis of copy protected content and user streams in a content distribution network.

BACKGROUND

Techniques for targeting advertisements have improved as consumers have become increasingly reliant on content distribution networks for media delivery. For instance, as there is more visibility into an individual user's viewing habits, predictive analytics can be used to predict the types of products and services the user is most likely to be interested in, and advertisements for those types of products and services can subsequently be delivered to the user (e.g., as part of the content stream). Consumers benefit from an increased relevance of the advertisements to which they are exposed, and advertisers benefit from having their advertisements shown to the consumers who are most likely to be responsive to the advertisements.

SUMMARY

In one example, the present disclosure describes a method, non-transitory computer readable medium, and apparatus for improving the analysis of copy protected content and user streams in a content distribution network. For instance, in one example, a method performed by a processing system including at least one processor includes obtaining a first stream of audio and video data, wherein the first stream of audio and video data comprises a lower-resolution version of a second stream of audio and video data that is transmitted to a first user device over a content distribution network and encrypted using a high-bandwidth digital content protection protocol, performing an analysis technique on the first stream of audio and video data in order to extract audio and video artifacts which from which content of the first stream of audio and video data is inferred, deriving a signature marker from the audio and video artifacts, and sending the signature marker to the first user device.

In another example, a non-transitory computer readable medium stores instructions which, when executed by a processing system including at least one processor, cause the processing system to perform operations. The operations include obtaining a first stream of audio and video data, wherein the first stream of audio and video data comprises a lower-resolution version of a second stream of audio and video data that is transmitted to a first user device over a content distribution network and encrypted using a high-bandwidth digital content protection protocol, performing an analysis technique on the first stream of audio and video data in order to extract audio and video artifacts which from which content of the first stream of audio and video data is inferred, deriving a signature marker from the audio and video artifacts, and sending the signature marker to the first user device.

In another example, an apparatus includes a processing system including at least one processor and a non-transitory computer readable medium storing instructions which, when executed by the processing system, cause the processing system to perform operations. The operations include obtaining a first stream of audio and video data, wherein the first stream of audio and video data comprises a lower-resolution version of a second stream of audio and video data that is transmitted to a first user device over a content distribution network and encrypted using a high-bandwidth digital content protection protocol, performing an analysis technique on the first stream of audio and video data in order to extract audio and video artifacts which from which content of the first stream of audio and video data is inferred, deriving a signature marker from the audio and video artifacts, and sending the signature marker to the first user device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
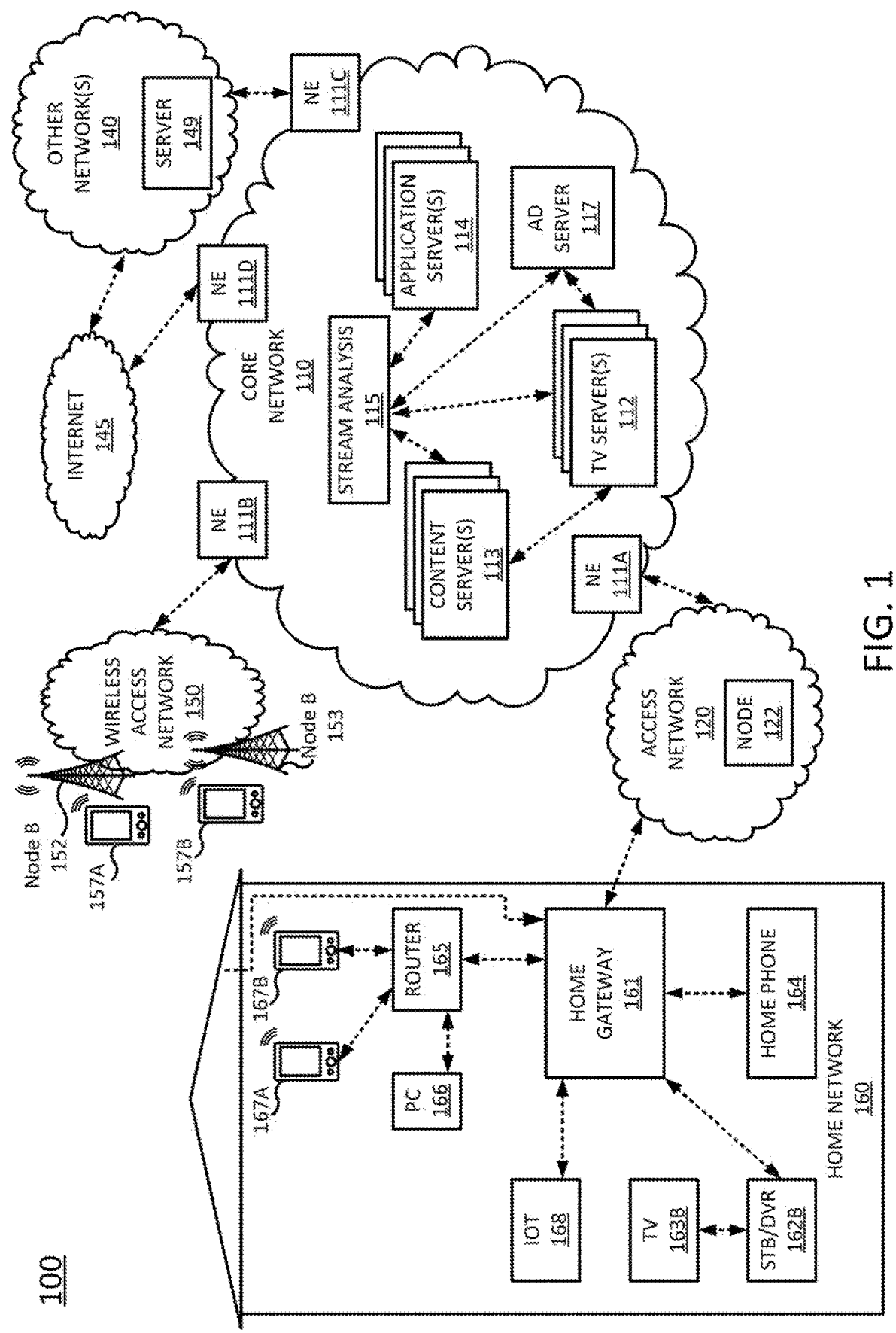
FIG. 1 illustrates an example network, related to the present disclosure.

In one example, the present disclosure provides a means for improving the analysis of copy protected content and user streams in a content distribution network. As discussed above, techniques for targeting advertisements have improved as consumers have become increasingly reliant on content distribution networks for media delivery. For instance, as there is more visibility into an individual user's viewing habits, predictive analytics can be used to predict the types of products and services the user is most likely to be interested in, and advertisements for those types of products and services can subsequently be delivered to the user (e.g., as part of the content stream). Consumers benefit from an increased relevance of the advertisements to which they are exposed, and advertisers benefit from having their advertisements shown to the consumers who are most likely to be responsive to the advertisements.

Conventional predictive analytics for selecting advertisements presented to content streaming consumers tend to rely on common ownership and/or data sharing agreements. For instance, one of the most common approaches to media assessment and analytics relies heavily on access to internal or contacted interfaces that allow for the monitoring and analysis of content consumption activities (e.g., video and audio streaming, web browsing, email, gaming, security and environment inputs and preferences, and the like). However, common ownership and/or data sharing agreements may not always exist, meaning that the visibility into consumption activities may be limited or non-existent in some cases. For instance, if a user streams video through a streaming service provider's embedded application (which may involve application-specific security and/or rendering controls) on the user's mobile phone, smart television, or the like, the network operator does not have the kind of visibility that would be available if the user instead logged into the streaming service provider's web site, because the stream of data may be copy protected. In other words, the use of embedded applications may create a "siloing" of each streaming service provider's content experience, limiting the extent of coordination and synchronization of the associated content streams.

Examples of the present disclosure provide a network service provider with visibility into media consumption activity that would otherwise be inaccessible due to the use of streaming service providers' embedded applications, by leveraging aspects of the high-bandwidth digital content protection (HDCP) protocol. HDCP is a protocol that manages compliant high-definition multimedia interface (HDMI) device ports. More specifically, HDCP is a form of digital copy protection that prevents copying of digital audio and video content as it travels across connections. HDCP stops HDCP-encrypted content from being played on unauthorized devices (or devices which have been modified to copy HDCP content). A device that has been licensed to play HDCP-enabled content must not, among other things, transmit high definition protected video to non-HDCP receivers. However, the device may transmit low-resolution (or "composite") video and audio to non-HDCP receivers.

Thus, in one example, the present disclosure splits a decrypted data stream carrying video and audio content into one high-definition stream authorized by the streaming service provider and one low-resolution (e.g., component audio and video) stream. At least a portion of the low-resolution stream is extracted and exported upstream to other devices in the local ecosystem, the network edge, or the network cloud for detailed analysis. The detailed analysis may identify signature markers in the low-resolution stream and provide these signature markers to the user device that is rendering the media content. From the signature markers, the user device may be able to more efficiently discern the nature of the consumption activity associated with the high-definition stream, thereby allowing for better targeting of advertising and other information.

Thus, for video and audio content being transmitted between licensed HDCP devices, information can be extracted from the video and audio directly. However, for video and audio content being transmitted to and/or from a device that does not have an HDCP license, useful information can still be extracted from the low-resolution data (such as keywords, video elements, and the like). Moreover, there is an efficiency in the analysis of the low-resolution data, as the volume of data that needs to be processed is lower.

Although examples of the present disclosure are discussed within the example context of streaming media, it will be appreciated that the concepts of the present disclosure may be useful in a variety of applications that involve the transmission of audio and data streams, including video and audio streaming, video gaming, web browsing, Internet of Things (IoT) devices, and Internet-connected cars. These and other aspects of the disclosure will be more readily apparent from the discussion of FIGS. 1-3.

To better understand the present disclosure, FIG. 1 illustrates an example network 100, related to the present disclosure. As shown in FIG. 1, the network 100 may comprise a content distribution network (e.g., data network) that connects mobile devices 157A, 157B, 167A and 167B, and devices such as home gateway 161, router 165, personal computer (PC) 166, home phone 164, Internet of Things (IoT) devices such as IoT device 168, and so forth, with one another and with various other devices via a core network 110, a wireless access network 150 (e.g., a cellular network), an access network 120, other networks 140 (including additional servers 149) and/or the Internet 145. Mobile devices 157A, 157B, 167A and 167B, and devices such as personal computer (PC) 166, IoT device 168, home phone 164, and the like may also be referred to herein as "customer devices" or "user endpoint devices."

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a global positioning system (GPS), a portable gaming device, a wearable smart device (e.g., a smart watch or a fitness tracker), a satellite radio receiver or satellite television receiver, or any other device having a user interface that is capable of receiving bandwidth from the network 100 in the form of streaming data. In one example, any one or more of mobile devices 157A, 157B, 167A, and 167B may have both cellular and non-cellular access capabilities and may further have wired communication and networking capabilities. Any one or more of mobile devices 157A, 157B, 167A, and 167B may have installed thereon a digital content distribution application that allows the user of the mobile device to access digital multimedia content such as videos, images, audio, web sites, and the like.

As illustrated in FIG. 1, network 100 includes a core network 110. In one example, core network 110 may combine core network components of a cellular network with components of a triple play or n-play service network; where triple play services include telephone services, Internet services and television services to subscribers, and n-play services may include any one or more of the triple play services plus additional services (e.g., such as security monitoring, health monitoring, geo fencing, and the like). For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. In one example, any one or more of the network elements 111A-111D may include an integrated content distribution management application. As shown in FIG. 1, core network 110 may also include a plurality of television (TV) servers 112, a plurality of content servers 113, a plurality of application servers 114, an advertising server (AS) 117, and a stream analysis server 115. For ease of illustration, various additional elements of core network 110 are omitted from FIG. 1.

With respect to television service provider functions, core network 110 may include one or more third party television content (TV) servers 112 for the delivery of television content. In this regard, television servers 112 may interact with content servers 113 and advertising server 117 to select which video programs, or other content and advertisements to provide to the home network 160, to the mobile devices 157A, 157B, 167A, and 167B, and to other downstream viewing locations.

In one example, content servers 113 may store scheduled television content for a number of third party television content providers, video-on-demand programming, local programming content, and so forth. For example, third party television content providers may upload various contents to the core network to be distributed to various subscribers. Alternatively, or in addition, third party television content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

The application server(s) 114 may include media servers operated by various streaming service providers, such as providers of streaming video, streaming audio, and the like. Access to media content provided by the streaming service providers may be subscription-based. For instance, users may need to register with and/or pay a fee to the streaming service providers in order to access the media content provided by the streaming service providers.

The stream analysis server 115 may analyze low-resolution versions of data (e.g., video and audio) streams delivered to the mobile devices 157A, 157B, 167A and 167B, and devices such as personal computer (PC) 166, IoT device 168, home phone 164, and the like. The low-resolution versions of the streams may be low-resolution in comparison to higher resolution versions of the streams that are delivered to the devices according to the HDCP protocol, discussed above. As discussed in further detail below, the stream analysis server 115 may extract video and audio artifacts from the low-resolution streams that may help to identify user interests and preferences. The user interests and preferences can, in turn, be delivered to the mobile devices 157A, 157B, 167A and 167B, and devices such as personal computer (PC) 166, IoT device 168, home phone 164, and the like as signature markers, which the mobile devices 157A, 157B, 167A and 167B, and devices such as personal computer (PC) 166, IoT device 168, home phone 164, and the like can use to select advertisements for presentation to a user.

In further examples, the video and audio artifacts may be correlated with metadata obtained from other devices (e.g., mobile devices 157A, 157B, 167A and 167B, and devices such as personal computer (PC) 166, IoT device 168, home phone 164, NEs 111A-111D, servers 149, and/or other devices). The metadata may also be used to determine when unauthorized devices have obtained or are attempting to obtain copy protected streams, thereby minimizing piracy of copy protected content.

One specific example of a method for improving the analysis of copy protected content and user streams in a content distribution network is discussed in greater detail in connection with FIG. 2.

In one example, the access network 120 may comprise a Digital Subscriber Line (DSL) network, a Local Area Network (LAN), a cellular or wireless access network, a $3^{rd}$ party network, and the like. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to communications with web servers via the Internet 145 and/or other networks 140, and so forth.

In one example, home network 160 may include a router 165, which receives data/communications associated with different types of media, e.g., television, phone, and Internet, and separates these communications for the appropriate devices. The data/communications may be received via access network 120, for instance. In one example, Internet communications are sent to and received from router 165, which may be capable of both wired and/or wireless communication. In turn, router 165 receives data from and sends data to the appropriate devices, e.g., personal computer (PC) 166, mobile devices 167A, and 167B, IoT device 168, and so forth. Each of these devices may be configured to support media content of particular file formats. In one example, router 165 may further communicate with other devices in the home network 160, such as set top boxes, smart televisions, or the like (not shown). In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Thus, the low resolution versions of the data streams containing the copy protected media content, though not of optimal quality for end user consumption, may still yield useful information that can be used to better target advertising and other types of content to users. For instance, as discussed in further detail below, although a video stream may not look good, keywords could still be extracted from the audio that may give clues as to the video stream's content. Knowing the video stream's content may help to guide selection of advertising and other types of targeted content to better match a user's interests and preferences.

Figure 2:
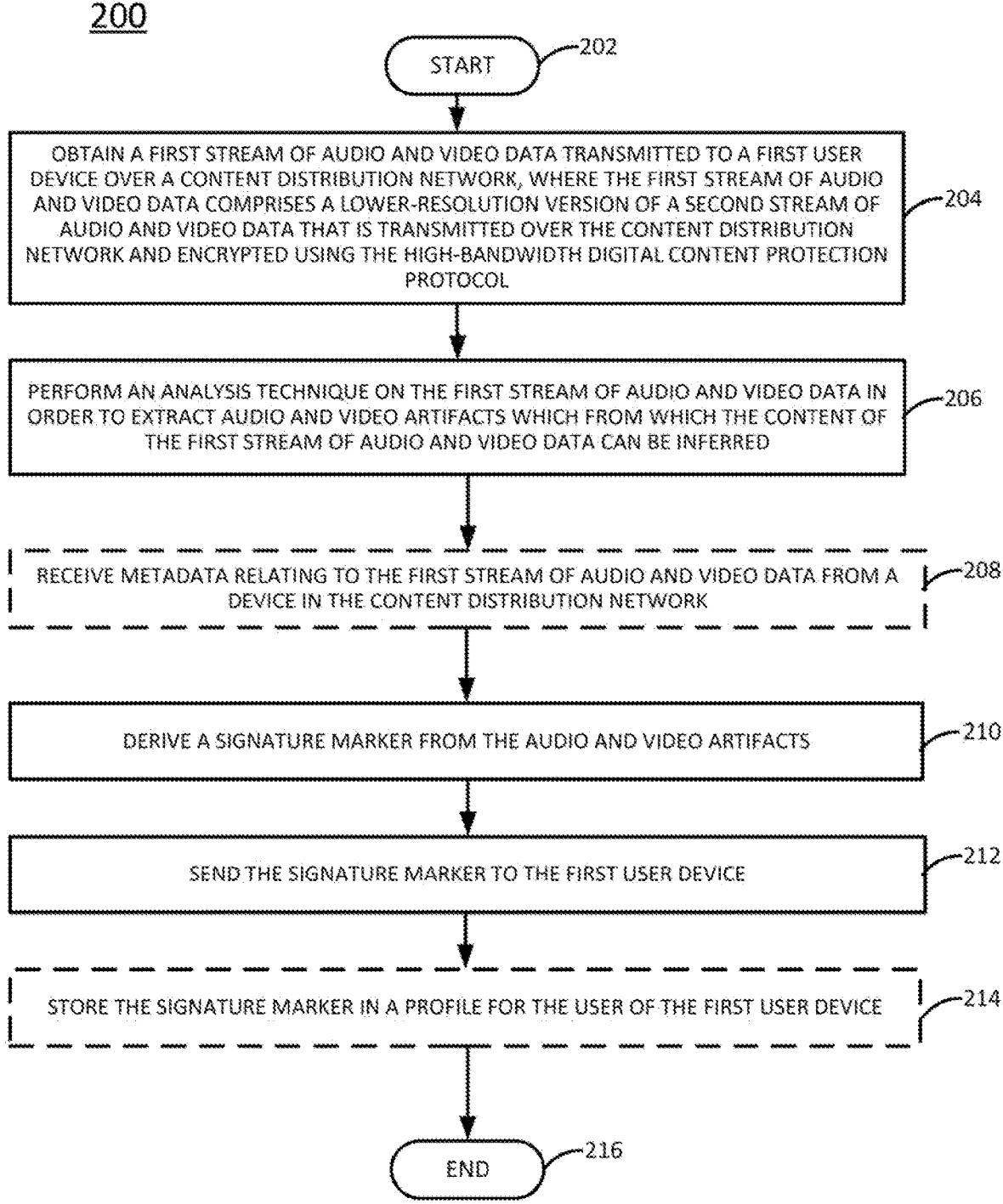
FIG. 2 illustrates a flowchart of an example method for improving the analysis of copy protected content and user streams in a content distribution network.

To further aid in understanding the present disclosure, FIG. 2 illustrates a flowchart of an example method 200 for improving the analysis of copy protected content and user streams in a content distribution network. In one example, the method 200 may be performed by an application server, such as the stream analysis server 115 of FIG. 1 or another server (e.g., servers 114 and/or servers 149). However, in other examples, the method 200 may be performed by another device or devices, such as the computing device 300 illustrated in FIG. 3 and discussed in further detail below. For the sake of example, the method 200 is described as being performed by a processing system.

The method 200 begins in step 202. In step 204, the processing system may obtain a first stream of audio and video data, wherein the first stream of audio and video data comprises a lower-resolution version of a second stream of audio and video data that is transmitted to a first user device over a content distribution network and encrypted using a high-bandwidth digital content protection (HDCP) protocol.

In one example, the second stream of audio and video data is being rendered at a first device after being transmitted from a second device. In one example, the second device may be a device that is operated by a media content service provider, such as a server for providing streaming audio or video, games, web content, and the like. The first device may be a user endpoint device, such as a mobile phone, a laptop computer, a desk top computer, a tablet computer, a set top box, a smart television, a gaming device (e.g., a console or head mounted display), an IoT device (e.g., a smart security system), an Internet-connected car, a wearable Internet-connected device (e.g., a smart watch or fitness tracker), or the like. For instance, the stream of audio and video data may comprise a movie that is being streamed from a server of a streaming video service provider to a smart television of a subscriber.

In one example, the first stream of audio and video data is obtained directly from the point of rendering. For instance, if the second stream of audio and video data is being rendered at a user endpoint device as described above, then the user endpoint device may provide the first stream of audio and video data directly to the processing system. In another example, the first stream of audio and video data may be obtained indirectly from the point of rendering. For instance, a switch at the network edge (e.g., any of the NEs illustrated in FIG. 1), which may include an integrated content distribution management application, may obtain the first stream of audio and video data directly from the user endpoint device and may then forward the first stream of audio and video data to the processing system.

In step 206, the processing system may perform one or more analysis techniques on the first stream of audio and video data in order to extract audio and video artifacts from which the content of the first stream of audio and video data can be inferred. For instance, the processing system may perform speech recognition techniques in order to recognize keywords in the audio data, where the keywords may provide insight into the nature of the first stream of audio and video data (e.g., identification of the first stream of audio and video data as belonging to a particular film or episode of a particular television show, genre of the film or television show, actors or objects appearing in the film or television show, etc.). As an example, the beginning of an episode of a television show may begin with a recap of the previous episode, where the recap begins with a voiceover saying, "Previously, on Show XYZ . . . ." By performing speech recognition on this short line of voiceover, the processing system can determine that a user of the first device is watching an episode of Show XYZ. This information may provide the processing system with insights into the television shows in which the user of the first user device is interested, as well as the genres of content, actors, and the like in which the user of the first user device is interested (e.g., the user may enjoy a specific television show, or science fiction content, etc.).

In another example, the user of the first user device may be watching an episode of a reality television program, and speech recognition processing could be used to detect when a personality on the reality television program is talking about a specific place (e.g., a city, a restaurant, or a store that the personality is visiting), a specific product (e.g., a specific brand of clothing, cosmetics, or appliances that the personality is using), a specific person (e.g., a musician the personality is going to see perform), or the like. For instance, keywords identifying the specific place, specific product, specific person, or the like could be detected within a string of recognized speech. Recognizing speech may also help to detect the languages of the content that the user of the first user device consumes, which may provide further insight into the user's preferences and interests (e.g., the user may have a preference for content in a particular language or enjoy Spanish-language soap operas, etc.).

As another example, voice recognition processing may help the processing system to recognize the voice of a well-known television host or news anchor in the audio data, thereby allowing the processing system to determine that the user of the first user device is watching an episode of a late night show or a news broadcast. Alternatively, the voice recognition processing may help the processing system to recognize the voice of a particular movie or television character or a particular musician, which may provide insights into the types of television shows, movies, and music in which the user of the first user device is interested (e.g., the user may enjoy a particular late night show).

As another example, text recognition processing may help the processing system to recognize text in the first stream of audio and video data. For instance, providing that the low-resolution video data is clear enough to read text, text recognition techniques could help the processing system to recognize television and movie titles, names in credits (e.g., actors, directors, composers, etc.), text on objects appearing in the video data (e.g., place names on street and highway signs, storefronts, etc.), keywords in closed captioning tracks or subtitles, and the like. This information may provide insight into the types of content, actors, languages, and the like in which the user of the first user device is interested.

As another example, object recognition processing may help the processing system to recognize objects appearing in the video data. For instance, providing that the low-resolution video data is clear enough to detect object characteristics (e.g., size, shape, color, markings, etc.), object recognition techniques could help the processing system to recognize things like vehicles, foods, consumer products, landmarks, and the like. This information may provide insight into the types of objects or content in which the user of the first user device may be interested (e.g., the user may enjoy a television show in which a distinctive vehicle is featured prominently).

As another example, facial recognition processing may help the processing system to recognize people appearing in the video data. For instance, providing that the low-resolution video data is clear enough to detect facial characteristics, facial recognition techniques could help the processing system to recognize actors, characters, public figures, and the like. This information may provide insight into the actors, characters, and the like in which the user of the first user device may be interested (e.g., the user may enjoy a particular film franchise with recurring characters).

Thus, even though the first stream of audio and video data may contain relatively low resolution data that might not be optimal for user playback, the data may still be useful for the purposes of inferring information about user interests and preferences.

In optional step 208 (illustrated in phantom), the processing system may receive metadata relating to the first stream of audio and video data from a device (or from multiple other devices) in the content distribution network. For instance, at least some of the metadata may be received from the same device on which the first stream of audio and video data is being rendered (e.g., the first user device). In a further example, at least some of the metadata could also be received from one or more other user devices which are rendering the first stream of audio and video data. In a further example, at least some of the metadata may be received from other devices in the content distribution network (e.g., a media server that serves as a source of the first stream of audio and video data, a switch or router that the first stream of audio and video data traverses on its way from the media server to the first user device, etc.).

In one example, the metadata may include metadata that relates to content licensing (e.g., metadata that indicates whether the first user device is an HDCP-licensed device, and/or any devices traversed by the first stream of audio and video data on the path to the first user device are HDCP-licensed). This metadata may help to verify that devices receiving the first stream of audio and video data are authorized to receive the data (e.g., are HDCP-licensed).

In another example, the metadata may include metadata indicating handling of the first stream of audio and video data by the content distribution network and infrastructure. This metadata may help to verify that the first stream of audio and video data is delivered in a manner that satisfies any quality of service (QoS) constraints. For example, the metadata may indicate an encoding bitrate of the audio and video data contained in the first stream of audio and video data, a play rate of the audio and video data contained in the first stream of audio and video data, a post-buffer lag length of the first user device, a play length of the first stream of audio and video data, a lag length of the first stream of audio and video data, a number of packets (or bytes) transferred per unit of time in the first stream of audio and video data, and/or other metrics.

In another example, the metadata may include metadata that indicates consumption habits of the user of the first user device. For instance, location metadata for the first user device may indicate that the user of the first user device visits the same coffee shop every weekday morning between 8:00 AM and 8:30 AM, or that the first user always takes the same route from home to work.

In another example, the metadata may indicate events that may serve as triggers for increased or decreased network traffic to/from the first user device. For instance, if the first user device is an IoT device such as an Internet-connected doorbell, the IoT device may normally be relatively inactive during the week. However, between Thanksgiving and the end of December, the Internet connected doorbell may be much more active during the week. Similarly, a commercial customer's supply chain needs may be inferred from metadata indicating when IoT devices in the supply chain are active (even if visibility into the supply chain itself is not available).

In step 210, the processing system may derive a signature marker from the audio and video artifacts extracted in step 206 (and optionally also from the metadata obtained in step 208). In one example, the signature marker may comprise a piece of metadata that indicates a user interest or preference that has been inferred from at least the audio and video artifacts. For instance, a signature marker may indicate a television show or a film franchise that the user of the first user device has watched. The signature marker could also indicate a film genre that the user of the first user device has watched frequently (e.g., fifty percent of the movies watched by the user of the first device are buddy comedies), or an actor who frequently stars in movies the user of the first device has watched. The signature marker could also indicate a language preference of the user of the first user device (e.g., the user typically watches with English dubbing, but sometimes requests Spanish subtitles).

In another example, the signature marker may comprise a piece of metadata that indicates a type of advertising that should be presented to the user of the first user device. For instance, based on an analysis of the user's inferred interests and preferences, the processing system may determine that the user is more likely to be receptive to advertisements that are presented in a particular language, that are funny in tone, that star a specific actor, or that advertise a specific type of product or service (e.g., sports cars, kid-friendly vacation spots, an upcoming film sequel, etc.). Thus, the signature marker may help guide selection of advertising content that may be presented to the user of the first user device.

In step 212, the processing system may send the signature marker to the first user device. The first user device may subsequently utilize the signature marker to guide selection of advertising content to present to the user of the first user device. For instance, as noted above, the signature marker may indicate the user's interests and or preferences. Knowing these interests and/or preferences may help the user device to choose advertising content for presentation to the user that the user is more likely to be receptive and responsive to. For instance, if the signature marker indicates that the user prefers to watch content in Spanish, then the first user device may select Spanish-language advertising content for presentation to the user of the first user device.

In optional step 214 (illustrated in phantom), the processing system may store the signature marker in a profile for the user of the first user device. This may allow any signature marker for the user to follow the user to different content consumption events and even to different service provider platforms. For instance, if the first user device is currently receiving the first stream of audio and video data from a first streaming service provider, then the next time the first user device is logged in to stream from the first streaming service provider's platform, the signature marker will still be available to guide selection of advertising content. Furthermore, if the first user device logs into a second streaming service provider's platform, the signature markers derived from the interactions on the first streaming service provider's platform may still be available to guide selection of advertising content. Thus, the profile may be stored in the network, e.g., at a database that is available to the processing system. The processing system may make the profile (or just the signature marker(s)) available to the first user device (or to other user devices used by the user) whenever the user uses the first user device to play media content.

The method 200 may end in step 216.

The method 200 therefore provides a robust and flexible approach to managing the analysis of multiple diverse media streams, which may, in some cases, allow for limited content visibility. By extracting audio and video artifact from low-resolution versions of the data streams, however, valuable insights into user interests and preferences may be derived. For instance, even though the resolution of a video stream may be lower than is ideal for viewing, artifacts can still be extracted from the associated audio that may help to infer the user interests and preferences. These user interests and preferences can then be used to guide selection of advertising content for presentation to the user.

As an additional benefit, the amount of data that must be processed to derive these insights may be greatly reduced given the reduction in data resolution. Thus, the approach disclosed herein utilizes resources efficiently to derive these insights.

Furthermore, metadata gathered from network devices may help to identify when unauthorized devices are attempting to access content, thereby helping streaming service providers to minimize piracy incidents. Moreover, having a more accurate understanding of usage statistics may benefit streaming service providers in other ways. For instance, a streaming service provider may derive revenue from the number of authorized subscribers who have viewed an advertisement, or may pay licensing fees based on a number of authorized subscribers who have played a licensed media. Examples of the present disclosure may help the streaming service provider to determine accurate user consumption numbers.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

Figure 3:
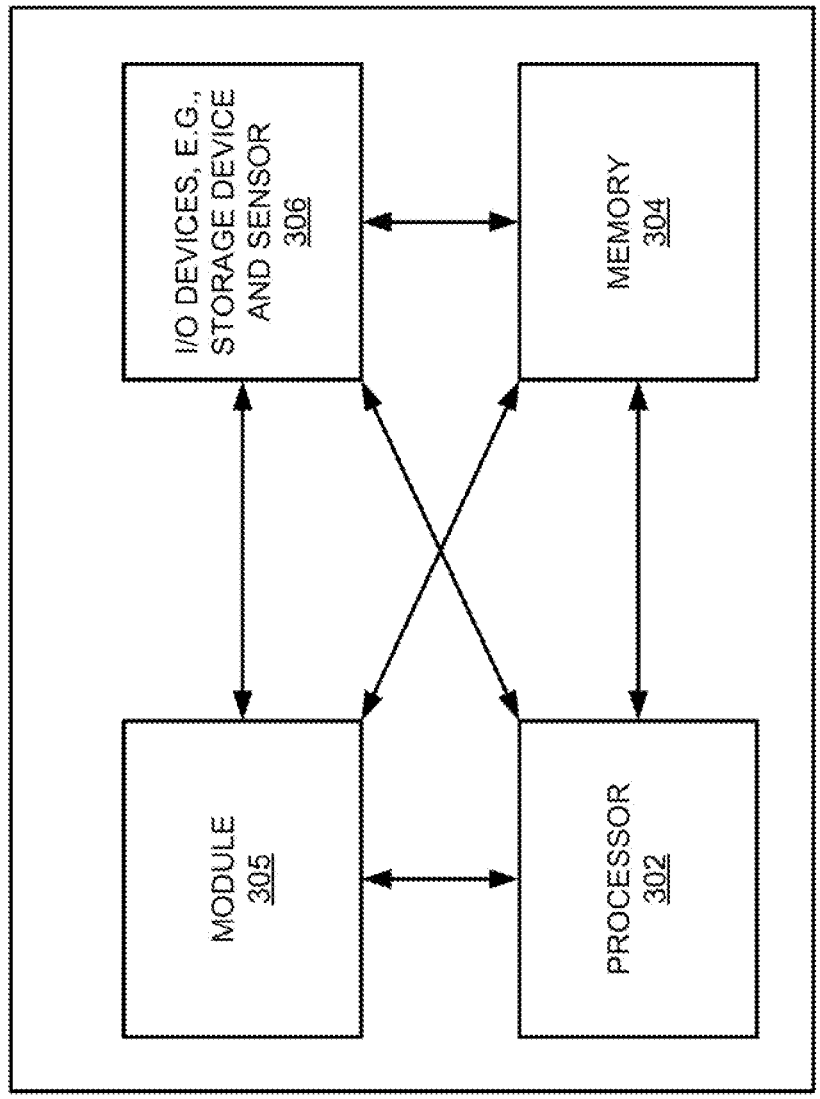
FIG. 3 illustrates a high-level block diagram of an example computing device specifically programmed to improve the analysis of copy protected content and user streams in a content distribution network.

FIG. 3 illustrates a high-level block diagram of an example computing device 300 specifically programmed to improve the analysis of copy protected content and user streams in a content distribution network. For example, any of the stream analysis server 115, application server 114, and/or servers 149 illustrated in FIG. 1 may be configured as illustrated in FIG. 3. Alternatively, certain functions of the computing device 300 may be supported across one or more devices in the network 100 of FIG. 1, such as a repository of the stream analysis server 115, application server 114, and/or servers 149.

As depicted in FIG. 3, the system 300 comprises a hardware processor element 302, a memory 304, a module 305 for improving the analysis of copy protected content and user streams in a content distribution network, and various input/output (I/O) devices 306.

The hardware processor 302 may comprise, for example, a microprocessor, a central processing unit (CPU), or the like. The memory 304 may comprise, for example, volatile and/or non-volatile memory, such as random access memory (RAM), read only memory (ROM), static RAM (SRAM) memory, Flash memory, a disk drive, an optical drive, a magnetic drive, and/or a Universal Serial Bus (USB) drive. The module 305 for improving the analysis of copy protected content and user streams in a content distribution network may include circuitry and/or logic for performing special purpose functions described herein relating to improving the analysis of copy protected content and user streams in a content distribution network. The input/output devices 306 may include, for example, a camera, a video camera, storage devices (including but not limited to, a tape drive, a floppy drive, a hard disk drive or a compact disk drive), a receiver, a transmitter, a display, an output port, a speaker, a microphone, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed below is implemented in a distributed or parallel manner fora particular illustrative example, i.e., the steps of the below method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the below disclosed method(s). In one example, instructions and data for the present module or process 305 for improving the analysis of copy protected content and user streams in a content distribution network (e.g., a software program comprising computer-executable instructions) can be loaded into memory 304 and executed by hardware processor element 302 to implement the steps, functions or operations as discussed below in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the below described method(s) can be perceived as a programmed processor or a specialized processor. As such, the present module 305 for improving the analysis of copy protected content and user streams in a content distribution network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
    obtaining, by a processing system including at least one processor, a first stream of audio and video data from a first user device, wherein the first stream of audio and video data comprises a lower-resolution version of a second stream of audio and video data that is transmitted over a content distribution network from a server operated by a media service provider to the first user device for consumption by a user of the first user device, and wherein the second stream of audio and video data is encrypted using a high-bandwidth digital content protection protocol;
    performing, by the processing system, an analysis technique on the first stream of audio and video data in order to extract audio and video artifacts from which content of the first stream of audio and video data is inferred;
    deriving, by the processing system, a signature marker from the audio and video artifacts; and
    sending, by the processing system, the signature marker to the first user device,
    wherein the processing system is part of a network service provider device, different from the first user device and from the server operated by the media service provider, and wherein the network service provider device lacks authorization to receive the second stream of audio and video data.

2. The method of claim 1, wherein the first stream of audio and video data is obtained directly from the first user device.

3. The method of claim 1, wherein the first stream of audio and video data is obtained indirectly from the first user device via a device at an edge of the content distribution network.

4. The method of claim 3, wherein the device at the edge of the content distribution network comprises a switch including an integrated content distribution management application.

5. The method of claim 1, wherein the analysis technique comprises a speech recognition technique that recognizes keywords in the first stream of audio and video data.

6. The method of claim 1, wherein the analysis technique comprises a speech recognition technique that recognizes a language spoken in the first stream of audio and video data.

7. The method of claim 1, wherein the analysis technique comprises a voice recognition processing technique that recognizes a voice of an individual who speaks in the first stream of audio and video data.

8. The method of claim 1, wherein the analysis technique comprises a text recognition processing technique that recognizes text appearing in the first stream of audio and video data.

9. The method of claim 1, wherein the analysis technique comprises an object recognition processing technique that recognizes an object appearing in the first stream of audio and video data.

10. The method of claim 1, wherein the analysis technique comprises a facial recognition processing technique that recognizes people appearing in the first stream of audio and video data.

11. The method of claim 1, wherein the signature marker comprises a piece of metadata that indicates at least one of: a user interest that has been inferred from at least the audio and video artifacts or a user preference that has been inferred from at least the audio and video artifacts.

12. The method of claim 11, further comprising:
    storing, by the processing system, the signature marker in a profile for a user of the first user device, wherein the profile records the at least one of: the user interest that has been inferred from at least the audio and video artifacts or the user preference that has been inferred from at least the audio and video artifacts.

13. The method of claim 1, the signature marker is used by the first user device to guide selection of content that is consistent with an interest of the user for presentation on the first user device.

14. The method of claim 1, further comprising:
    receiving, by the processing system, metadata relating to the first stream of audio and video data from a device in the content distribution network.

15. The method of claim 14, wherein the metadata verifies that the first user device is authorized to receive the first stream of audio and video data.

16. The method of claim 14, wherein the metadata verifies that the first stream of audio and video data is delivered to the first user device in a manner that satisfies one or more quality of service constraints for the first user device.

17. The method of claim 14, wherein the metadata includes location metadata for the first user device.

18. The method of claim 14, wherein the metadata indicates an event that serves as a trigger for a change in network traffic to or from the first user device.

19. A non-transitory computer readable medium storing instructions that, when executed by a processing system including at least one processor, cause the processing system to perform operations, the operations comprising:
    obtaining a first stream of audio and video data from a first user device, wherein the first stream of audio and video data comprises a lower-resolution version of a second stream of audio and video data that is transmitted over a content distribution network from a server operated by a media service provider to the first user device for consumption by a user of the first user device, and wherein the second stream of audio and video data is encrypted using a high-bandwidth digital content protection protocol;
    performing an analysis technique on the first stream of audio and video data in order to extract audio and video artifacts from which content of the first stream of audio and video data is inferred;

deriving a signature marker from the audio and video artifacts; and sending the signature marker to the first user device, wherein the processing system is part of a network service provider device, different from the first user device and from the server operated by the media service provider, and wherein the network service provider device lacks authorization to receive the second stream of audio and video data.

20. An apparatus comprising:

a processing system including at least one processor; and a non-transitory computer readable medium storing instructions that, when executed by the processing system, cause the processing system to perform operations, the operations comprising:

obtaining a first stream of audio and video data from a first user device, wherein the first stream of audio and video data comprises a lower-resolution version of a second stream of audio and video data that is transmitted over a content distribution network from a server operated by a media service provider to the first user device for consumption by a user of the first user device, and wherein the second stream of audio and video data is encrypted using a high-bandwidth digital content protection protocol;

performing an analysis technique on the first stream of audio and video data in order to extract audio and video artifacts which from which content of the first stream of audio and video data is inferred;

deriving a signature marker from the audio and video artifacts; and sending the signature marker to the first user device, wherein the processing system is part of a network service provider device, different from the first user device and from the server operated by the media service provider, and wherein the network service provider device lacks authorization to receive the second stream of audio and video data.

* * * * *